Dec. 15, 1970   A. KLEIN   3,546,779
MARKING MACHINE
Filed June 27, 1968   2 Sheets-Sheet 1

INVENTOR:
ALEC KLEIN
BY:
B. Dean Liddle
ATTORNEY

Dec. 15, 1970    A. KLEIN    3,546,779
MARKING MACHINE
Filed June 27, 1968    2 Sheets-Sheet 2
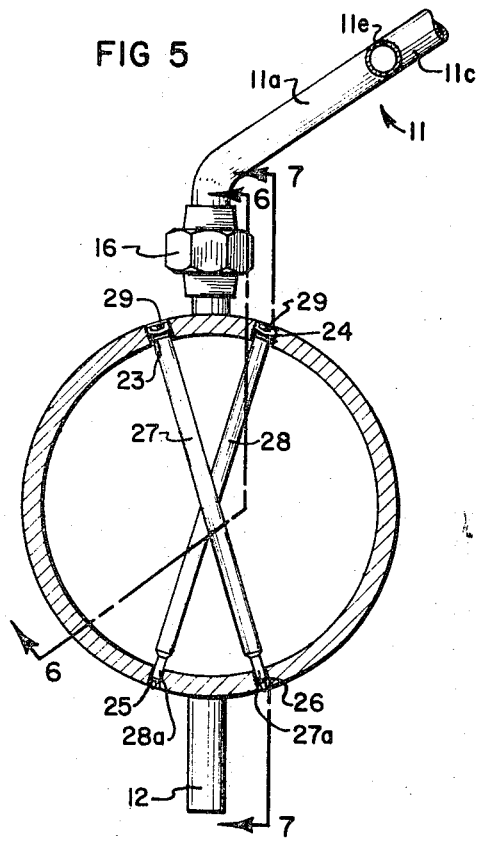
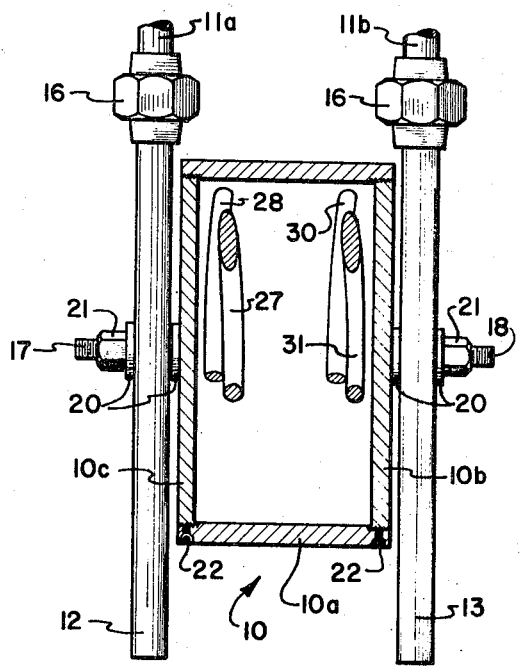
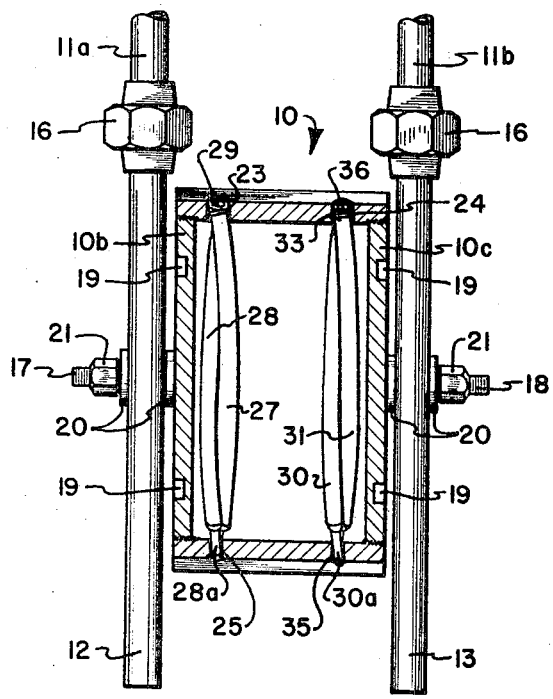
INVENTOR:
ALEC KLEIN
BY:
ATTORNEY excellent# United States Patent Office 3,546,779
Patented Dec. 15, 1970

3,546,779
MARKING MACHINE
Alec Klein, 9896 Sunflower Lane, Sandy, Utah 84070
Filed June 27, 1968, Ser. No. 740,532
Int. Cl. B43l *13/00*
U.S. Cl. 33—36
4 Claims

ABSTRACT OF THE DISCLOSURE

A roller wheel has an outer circumference dimensioned such that marker pens projecting therefrom provide spaced markings as the wheel is rolled along for the placement of building stud members and the like. The centerline measurements of the members will be at spaced standard distances. The marker pens are readily inserted and can be adjusted to provide continuous, effective marking. Guides are provided to insure proper travel of the roller and an elongate handle enables it to be used while walking.

BRIEF DESCRIPTION

In the construction of buildings, it is frequently necessary to measure standard distances to insure proper placement of various components. For example, studs, joists, rafters, trusses and other such components are usually positioned standard distances apart along a base board. The components themselves are most frequently made up of two by four boards or boards of other standard widths and it has heretofore been a time consuming and tedious chore to locate and mark the center line positions of the components on the base board and to then position the components on the centerline and square with the marked board.

There is, therefore, a need for a machine that will eliminate this time consuming and tedious measuring and marking while still providing accurate positioning indicators for the components to be positioned.

It is a principal object of the present invention to provide a machine that will mark a base board as it is pushed thereover such that components made of standard size boards can be readily positioned thereon at desired spaced distances, all without any tedious measuring being required.

Other objects are to provide such a machine that is fully guided and easy for even an untrained person to handle and that can be operated while walking; that is durable; that is provided with long lasting, adjustable marking pens; and that can be readily repaired, should such repairs be required.

Principal features of the invention include an easily disassembled roller wheel having a circumference corresponding to the standard center to center distance of the components to be positioned, and containing marker pens, the tips of which project through the wheel to spot mark the base board over which the roller is passed. The pens are positioned such that the marks made provide edge guides for the square placement of components of the members being positioned.

The roller wheel is free wheeling so that it will easily travel over the base board, and guides, projecting downwardly alongside the roller from an extended handle, hold the roller on the base board during its travel.

Additional objects and features of the invention will become apparent from the following detailed description and drawings, disclosing what is presently contemplated as being the best form of the invention.

THE DRAWINGS

Figure 1:
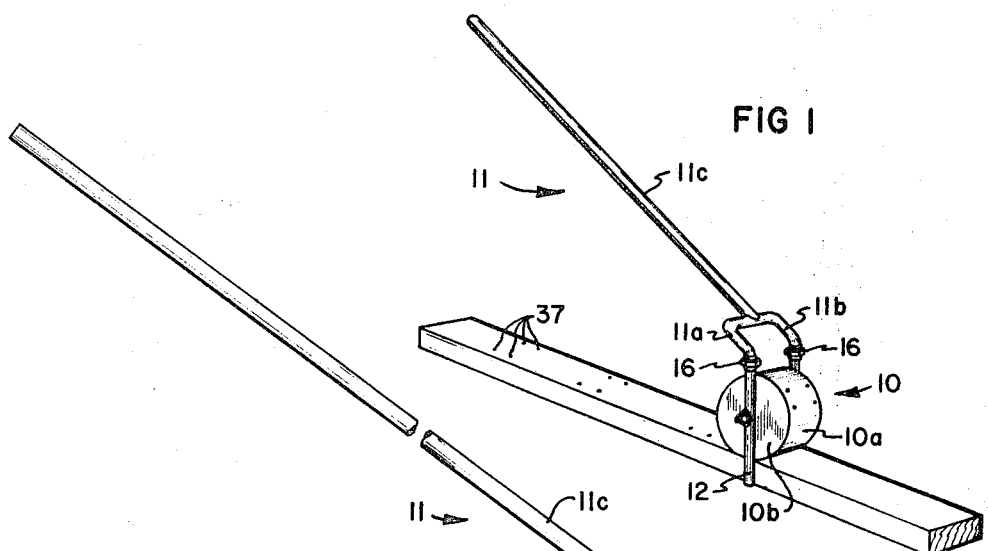
Figure 2:
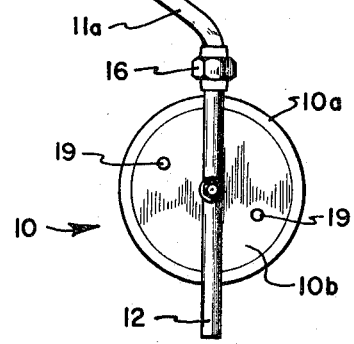
Figure 3:
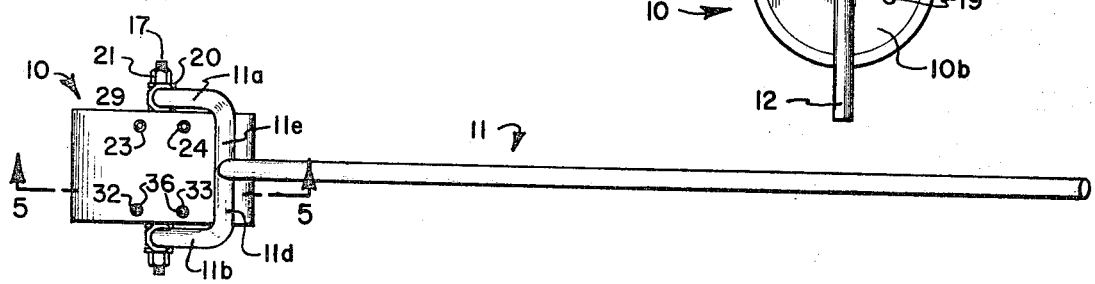
Figure 4:
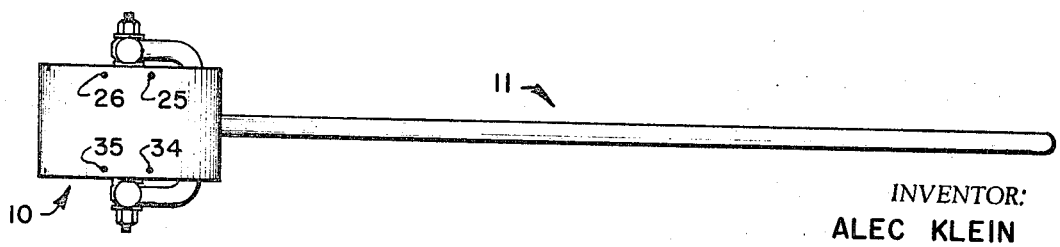

FIG. 1 is a perspective view of the invention, in use;
FIG. 2, a side elevation view;
FIG. 3, a top plan view;
FIG. 4, a bottom plan view;
FIG. 5, a vertical section, taken on the line 5—5 of FIG. 3;
FIG. 6, a section taken on the line 6—6 of FIG. 5; and
FIG. 7, a vertical section taken on the line 7—7 of FIG. 5.

DETAILED DESCRIPTION

Referring now to the drawings:

In the illustrated preferred embodiment, the machine of the invention includes a roller, shown generally at 10, a handle 11, guides 12 and 13, and stub axles 17 and 18 that are connected to the roller and that are respectively journaled through the guides 12 and 13.

The guides 12 and 13 are respectively releasably connected to the legs 11a and 11b of the bifurcated handle 11, by conventional couplings 16 and extend from the handle diametrically beyond the roller. An extension 11c of the handle extends upwardly from the shoulders 11d and 11e, respectively, which connect the legs and the extension, at an angle, such that when the legs are extending downwardly past the roller the extension reaches to a convenient height to be held by an operator walking behind the machine.

Roller 10 includes a cylindrical housing 10a that is interiorly threaded at both sides to receive circular, peripherally threaded, plates 10b and 10c. Stub axle 17 extends outwardly from the center of plate 10b and stub axle 18 extends out from the center of plate 10c. Spaced holes 19 in the side plates allow a spanner wrench (not shown) to be inserted so that the plates can be turned into or out of the cylindrical housing 10a.

Flat washers 20, surrounding the stub axles and spaced between the side plates and the guides and between the guides and nuts 21, threaded onto the ends of the axles insure free rotation of the axles and turning of the roller.

Set screws 22, FIG. 6, threaded through and recessed into the cylindrical housing 10a, engage the peripheries of the side plates to keep them from working loose from the cylindrical housing during operation of the machine.

A pair of spaced threaded holes 23 and 24 are provided adjacent one end of the cylindrical housing and a pair of nonthreaded, smaller holes 25 and 26 are provided on the opposite side thereof. Flexible shaft marker pen 27 is inserted through hole 23 until the tip 27a thereof, which is preferably made of felt or other such material not subject to being damaged on impact, projects slightly through hole 26. Another pen 28, of the same type as pen 27, is inserted through hole 24 and diagonally across the pen 27 until its tip 28a extends slightly out of the hole 25.

Recessed set screws 29, inserted into the holes 23 and 24, engage the ends of pens 27 and 28 which remain in the holes 23 and 24 and force the tips thereof to respectively extend through the holes 26 and 25. As the tips become worn the set screws are turned further into holes 23 and 24 to progressively force the tips 27a and 28a through the holes 26 and 25, respectively.

In similar fashion, pens 30 and 31 are inserted through threaded holes 32 and 33 at the other end of the cylindrical housing that are aligned with the holes 23 and 24, and extend through the roller, crossing inside, to have their tips 30a and 31a project out opposing holes 34 and 35 that are aligned with the holes 25 and 26. Recessed set screws 36 then hold the pens 30 and 31 in position in the holes 32 and 33 and provide means for adjusting the pens to compensate for wear.

Hole 25 is spaced from hole 26 and hole 34 is spaced from hole 35 such that the circumferential distance between them is just slightly greater than the width of the standard boards of the components to be positioned on a base board. The entire circumference of the roller is then made to have a length corresponding to the standard center to center distance between components. For example, the circumferential distance between holes 25 and 26 and between holes 34 and 35 may be three and five-eights inches and the overall outer circumference of the roller housing may be sixteen inches. Thus, as the roller is pushed along a base board, with the guides 12 and 13 closely straddling the base board, a set of four marks 37, FIG. 1, will be made with each complete revolution of the roller. Standard two by four boards, laid between the marks of the sets, and extending normal to the base boards, will then be spaced sixteen inches between their centers.

The dimensions of the roller and the distance between marking pen tips can be changed, as required. Also, by changing the starting position of the roller and rerunning it over the base board, other center to center distances between markings can be marked, without measuring.

Although a preferred form of my invention has been herein disclosed it is to be understood that the present disclosure is made by way of example and that variations are possible without departing from the scope of the hereinafter claimed subject matter, which subject matter I regard as my invention.

I claim:
1. A marking machine comprising:
a roller having a hollow cylindrical housing with an outer circumference of known dimension corresponding to a standard center to center distance of building components and removable side plates; a plurality of spaced fabric tipped marker pens within the housing and having tips capable of withstanding impacts and each pen having its own self-contained ink supply, said tips extending through holes in the outer circumference of the roller housing whereby the markers will spot mark a base board as the roller is rolled thereover, with an equal distance provided between each set of marks made as the roller turns; means in the housing for receiving the other ends of the pens to secure the said pens in place; a handle extending upwardly from the roller and having bifurcated legs; a guide forming a continuation of each of the legs, said guides journaling the roller and extending therepast to straddle a base board to be marked.

2. A marking machine according to claim 1, wherein:
the marker pens comprise a pair of fabric tipped pens at each end of the housing; and wherein:
said means are holes through the housing through which the pens are inserted.

3. A marking machine according to claim 2, wherein:
the holes through which the pens are inserted have screws threaded therein to bear against the pens and to force the tips thereof through their holes.

4. A marking machine according to claim 3, wherein:
the tips of the pens of each pair are aligned and are spaced a distance apart such that the standard board will fit between them to be aligned on the board to be marked.

References Cited
UNITED STATES PATENTS 2,451,595   10/1948   Wheeler _____ 33—39 (A)
3,046,884   7/1962   Pearson _____ 33—141.5 X HARRY N. HAROIAN, Primary Examiner U.S. Cl. X.R.
33—38